June 5, 1923.
J. H. SMITH
BEARING
Filed May 14, 1920
1,457,555
2 Sheets-Sheet 1
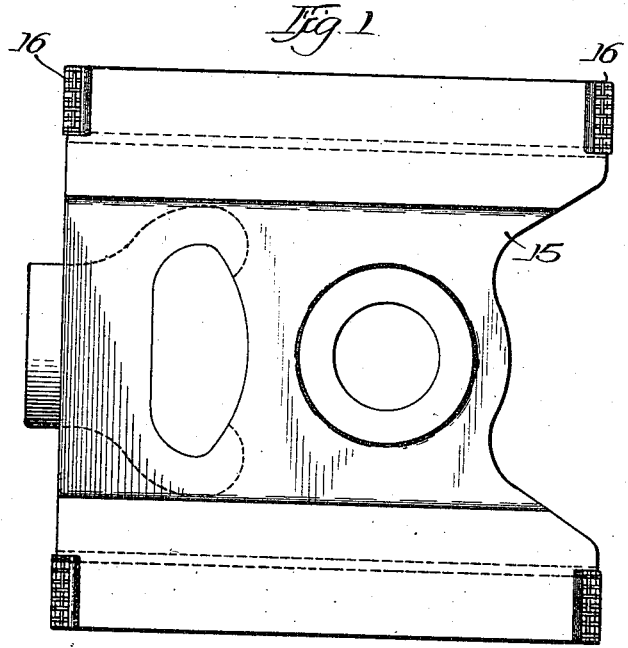
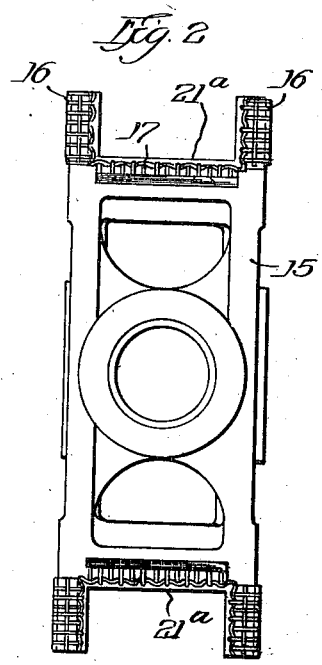
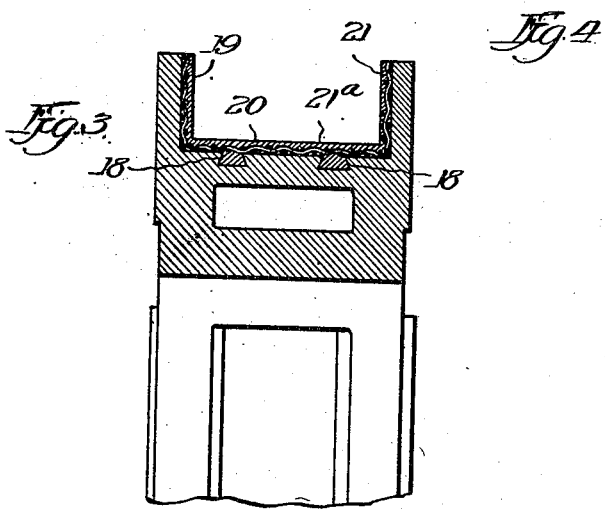
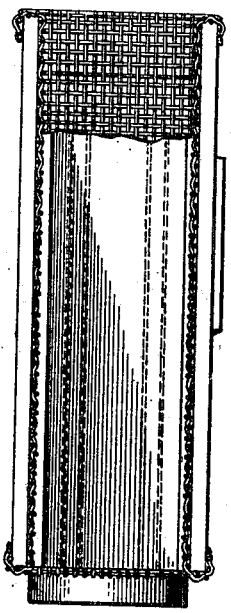
Inventor:
James H. Smith

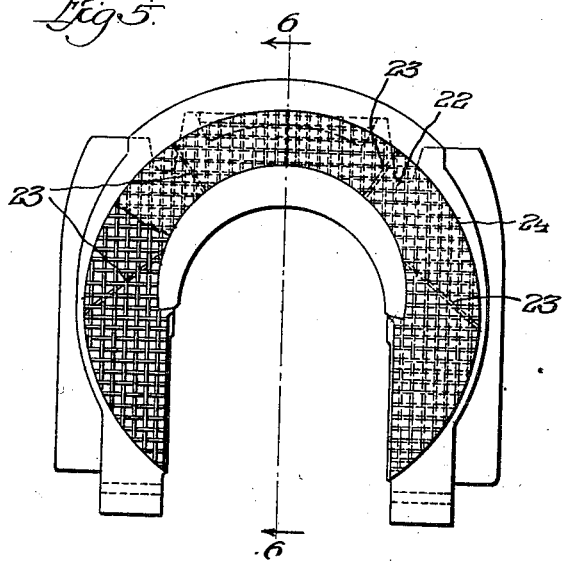
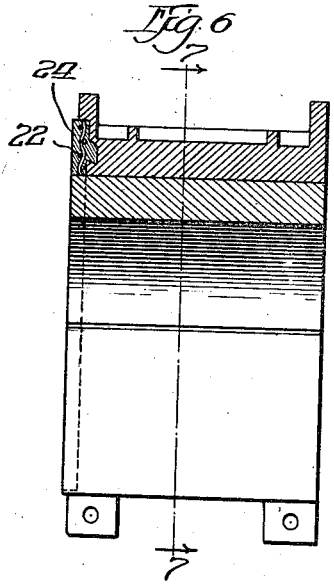
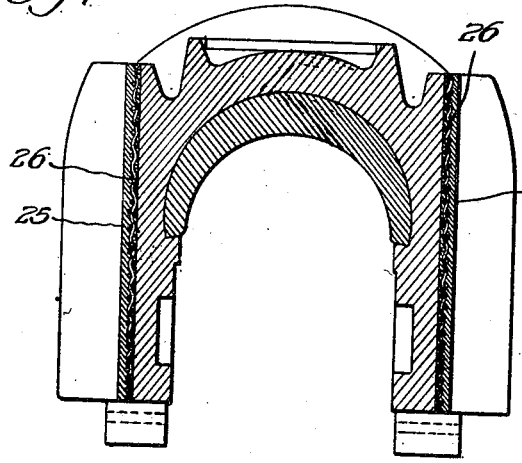
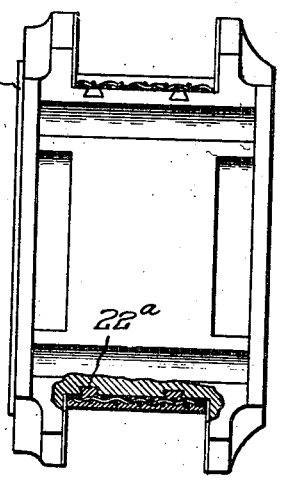
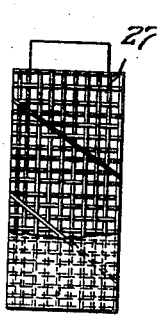
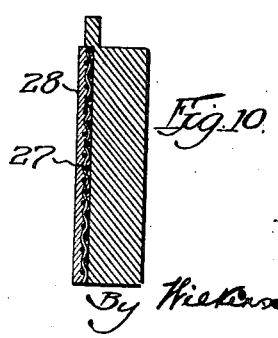

Patented June 5, 1923.

1,457,555

UNITED STATES PATENT OFFICE.

JAMES H. SMITH, OF CHICAGO, ILLINOIS.

BEARING.

Application filed May 14, 1920. Serial No. 381,258.

*To all whom it may concern:*

Be it known that I, JAMES H. SMITH, a citizen of the United States, residing at Chicago, in the county of Cook and State of Illinois, have invented certain new and useful Improvements in Bearings, of which the following is a specification.

My invention relates to means for securing bearing metal, such as babbitt, in friction surfaces.

My invention is particularly adapted to secure bearing metal in cross-heads and driving boxes of locomotives, although it is readily adaptable to other types of friction surfaces where bearing metal is usually employed.

My invention consists in securing a skeleton retainer such as a wire netting to the bearing casing, the netting being shaped to conform to the contour of said casing. The netting is secured to the surface of the casing preferably by welding, then the bearing metal is flowed over the netting, embedding the netting in the bearing metal, thus securely holding the bearing metal in position with the casing.

One object of my invention is to provide means for securing bearing metal within the bearing casing in an expeditious and secure manner.

Another object is to strengthen the bearing metal so that in the event any of the bearing metal becomes broken or cracked the same may still be retained in position and prevented from becoming an element of danger.

I have shown my invention specifically as applied to a cross-head of a locomotive and as applied to locomotive driving boxes.

The above-recited and other objects of my invention will be apparent from the drawings, wherein—

Figure 1 is a side elevation of a locomotive cross-head provided with my invention;

Figure 2 is an end elevation of the cross-head shown in Figure 1;

Figure 3 is an enlarged fragmentary vertical section through a portion of Figure 1;

Figure 4 is a plan of one of the guide ways of the cross-head of Figure 1, a portion of the bearing metal being broken away to show the retaining netting in position;

Figure 5 is a side elevation of a portion of a locomotive driving box to which my invention is applied;

Figure 6 is a vertical section on line 6—6 of Figure 5;

Figure 7 is a vertical section on line 7—7 of Figure 6;

Figure 8 is a top plan of the box of Figure 5; and

Figures 9 and 10 are a side elevation and a vertical section respectively of driving box wedges on the surfaces of which bearing metal has been secured in accordance with my invention.

Referring to Figures 1 to 4 inclusive of the drawings, the cross-head 15 is shown having top and bottom recesses which engage the usual cross-head guide members. For securing bearing metal to the friction surfaces of the cross-head in accordance with my invention, a netting of wire, the wires of which may be made of iron, steel or other metal, is suitably secured to the hard metal forming the cross-head by any desirable means, preferably by welding. In securing the netting in position the ends may be brought over as indicated at 16 and 17 to overlie the ends of the cross-head. The netting thus effects a secure holding of the bearing metal when the same is poured. As shown in Figures 2 and 3, the bottoms of the friction recesses are provided with grooves 18, which grooves are preferably enlarged toward the bottoms thereof. When the wire has been secured in position, the bearing metal, such as babbitt, in a molten state, is flowed over the netting, a suitable mold or core being inserted to define the inner surfaces 19, 20 and 21 of the bearing metal 21$^a$, which surfaces engage the guide members. The molten bearing metal flows into the grooves 18, which, on becoming solidified, serve as an additional means for securing the bearing metal in position. In Figure 4 there is shown the appearance of the guide recesses with the wire netting in position and also with the bearing metal formed thereover. As appears from the drawing, the bearing metal forms a solid mass enveloping the skeleton retainer.

In Figures 5 through 8, my invention is shown as being applied to locomotive driving boxes. The bearing metal is shown as applied to one side of a driving box, where the box engages the hub of the driving wheels. In this instance the netting 22 is suitably secured to the face of the driving box by welding, as at 23, and then the bearing metal 24, of proper thickness, flowed thereover. In Figure 7 the box flanges are shown as provided with bearing metal 25 applied to the inner portions thereof for engaging the wedges of the engine frame, the wire netting 26, welded to the box, being embedded in the bearing metal 25 and holding the latter in position. Figure 8 is a plan of the arrangement of Figure 7 showing the bottoms of the friction recesses provided with grooves 22ª similar to grooves 18 shown in Figure 3.

If desirable, instead of fixing the bearing metal to the bottoms of the box flanges as shown in Figures 7 and 8, it may be applied to the surfaces of the wedges. This construction is shown in Figures 9 and 10. Here the netting 27 is suitably welded to the surfaces of the wedges and the bearing metal 28 flowed thereover to embed the netting in the bearing metal.

An important feature of my method is that a bearing metal may be easily applied to a hard surface or casing with the assurance that although the bearing metal might crack, nevertheless it is retained in position by the skeleton or wire netting regardless of the number of cracks occurring therein. This feature is particularly desirable when used on the lateral surfaces of driving boxes and cross-heads, as any loss of the broken portions of the bearing metal might result in an excess of lateral play, thereby necessitating the withdrawal from service of the locomotive or other machine to which my invention might be applied.

While I have described more or less precisely the details of my invention, I do not wish to be understood as limiting myself thereto, as I contemplate changes in form and proportion of parts and substitution of equivalents as circumstances may suggest or render expedient, without departing from the spirit of my invention.

I claim:

1. In combination, a bearing support of material having a relatively high melting point, a skeleton retainer fastened to said support and bearing metal completely covering said retainer, and having said retainer embedded therein, whereby said bearing metal completely shields said retainer from the bearing surface, said bearing metal having a relatively low melting point, said skeleton retainer being fastened to said support separately and independently of said bearing metal.

2. In a bearing, the combination of a bearing support of material having a relatively high melting point, of a skeleton member fastened to said support and bearing metal in a solid mass enveloping said skeleton member and conforming to the adjacent surface of said support, said bearing metal having a relatively low melting point, said skeleton member being fastened to said support separately and independently of said bearing metal.

3. In a bearing, the combination of a bearing support of material having a relatively high melting point, of a metallic skeleton member welded to said support and bearing metal in a solid mass enveloping said skeleton member and conforming to the adjacent surface of said support, said bearing metal having a relatively low melting point.

4. The method of applying bearing metal to a supporting member which consists of providing a skeleton retainer, securely fastening same to said supporting member and flowing said bearing metal in molten state over said skeleton member, whereby upon solidification said bearing metal is held securely in place.

Signed at Chicago, Illinois, this 11th day of May, 1920.

JAMES H. SMITH.